(12) United States Patent
Field

(10) Patent No.: US 7,837,113 B2
(45) Date of Patent: Nov. 23, 2010

(54) METHOD FOR UPDATING INDICIA READERS

(75) Inventor: Willis Field, Weedsport, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 413 days.

(21) Appl. No.: 11/523,972

(22) Filed: Sep. 20, 2006

(65) Prior Publication Data
US 2008/0121715 A1    May 29, 2008

(51) Int. Cl.
*G06K 7/10* (2006.01)
(52) U.S. Cl. .............................. 235/472.01; 235/462.46
(58) Field of Classification Search ............ 235/462.45, 235/462.46, 472.01, 472.02, 472.03
See application file for complete search history.

(56) References Cited

U.S. PATENT DOCUMENTS

| | | | |
|---|---|---|---|
| 6,616,049 B1 * | 9/2003 | Barkan et al. | 235/472.03 |
| 2004/0016812 A1 * | 1/2004 | Schmidt et al. | 235/462.31 |
| 2006/0289654 A1 * | 12/2006 | Robinson et al. | 235/462.46 |
| 2007/0045424 A1 * | 3/2007 | Wang | 235/462.46 |
| 2007/0046467 A1 * | 3/2007 | Chakraborty et al. | 340/572.1 |

* cited by examiner

*Primary Examiner*—Karl D. Frech
(74) *Attorney, Agent, or Firm*—Hiscock & Barclay, LLP

(57) ABSTRACT

A data reader system includes a plurality of indicia readers for reading symbol indicia and producing a symbol signal representative of the symbol indicia. At least two of the indicia readers includes a processor for controlling the indicia reader, the processor having memory for storing firmware. A communication module is configured to communicate with other indicia readers and the indicia reader system is configured to transfer firmware to other indicia readers utilizing the communication modules.

11 Claims, 3 Drawing Sheets

METHOD FOR UPDATING INDICIA READERS

FIELD OF THE INVENTION

The present invention relates to indicia reading devices, and more particularly to a method of updating indicia reading.

BACKGROUND

Indicia reading devices (also referred to as scanners, readers, etc.) typically read data represented by printed indicia, (also referred to as symbols, symbology, bar codes, etc.) For instance one type of a symbol is an array of rectangular bars and spaces that are arranged in a specific way to represent elements of data in machine readable form. Optical indicia reading devices typically transmit light onto a symbol and receive light scattered and/or reflected back from a bar code symbol or indicia. The received light is interpreted by an image processor to extract the data represented by the symbol. Laser indicia reading devices typically utilize transmitted laser light.

One-dimensional (1D) optical bar code readers are characterized by reading data that is encoded along a single axis, in the widths of bars and spaces, so that such symbols can be read from a single scan along that axis, provided that the symbol is imaged with a sufficiently high resolution along that axis.

In order to allow the encoding of larger amounts of data in a single bar code symbol, a number of 1D stacked bar code symbologies have been developed which partition encoded data into multiple rows, each including a respective 1D bar code pattern, all or most all of which must be scanned and decoded, then linked together to form a complete message. Scanning still requires relatively higher resolution in one dimension only, but multiple linear scans are needed to read the whole symbol.

A class of bar code symbologies known as two dimensional (2D) matrix symbologies have been developed which offer orientation-free scanning and greater data densities and capacities than 1D symbologies. 2D matrix codes encode data as dark or light data elements within a regular polygonal matrix, accompanied by graphical finder, orientation and reference structures. Often times an optical reader may be portable and wireless in nature thereby providing added flexibility. In these circumstances, such readers form part of a wireless network in which data collected within the terminals is communicated to a host computer situated on a hardwired backbone via a wireless link. For example, the readers may include a radio or optical transceiver for communicating with a network computer.

Conventionally, a reader, whether portable or otherwise, may include a central processor which directly controls the operations of the various electrical components housed within the bar code reader. For example, the central processor controls detection of keyboard entries, display features, wireless communication functions, trigger detection, and bar code read and decode functionality.

Efforts regarding such systems have led to continuing developments to improve their versatility, practicality and efficiency.

DETAILED DESCRIPTION

Reference will now be made to exemplary embodiments of the invention which are illustrated in the accompanying drawings. This invention, however, may be embodied in various forms and should not be construed as limited to the embodiments set forth herein. Rather, these representative embodiments are described in detail so that this disclosure will be thorough and complete, and will fully convey the scope, structure, operation, functionality, and potential of applicability of the invention to those skilled in the art. Wherever possible, the same reference numbers will be used throughout the drawings to refer to the same or like parts. The term "scan" or "scanning" use herein refers to reading or extracting data from an information bearing indicia or symbol.

An exemplary indicia reader system in accordance with the invention may be adapted for reading symbol indicia for numerous functions. A detailed description of indicia readers and their operation is disclosed in commonly owned published United States Patent Application Publication No. 20030029917 entitled OPTICAL READER FOR IMAGING MODULE and United States Patent Application Publication No. 20030019934 entitled OPTICAL READER AIMING ASSEMBLY COMPRISING APERTURE, United States Patent Application Publication No. 20040134989 entitled DECODER BOARD FOR AN OPTICAL READER UTILIZING A PLURALITY OF IMAGING FORMATS which are hereby incorporated herein by reference.

Figure 1:
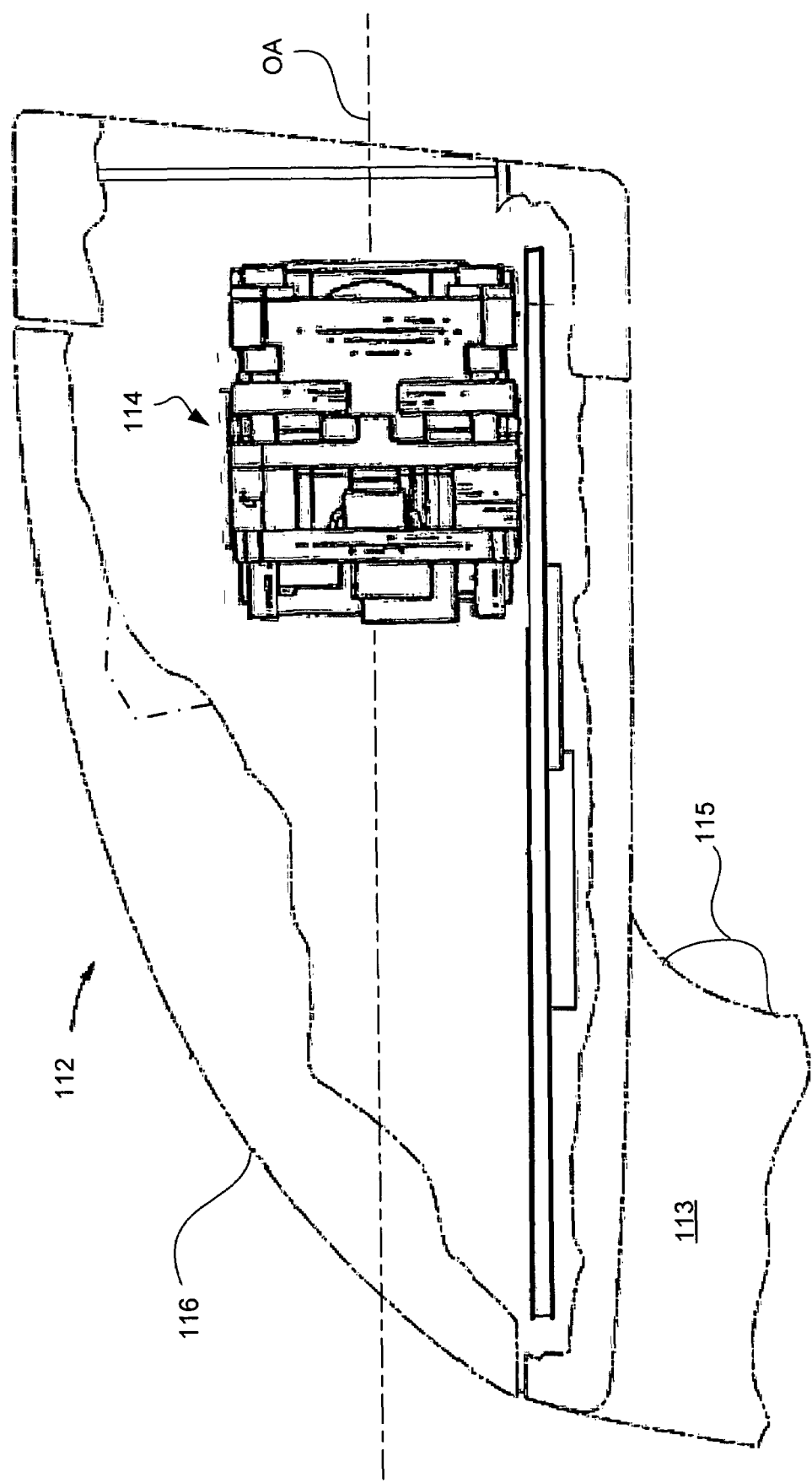
FIG. 1 is a fragmentary partially cutaway side view of an exemplary indicia reader in accordance with the present invention.
Figure 2:
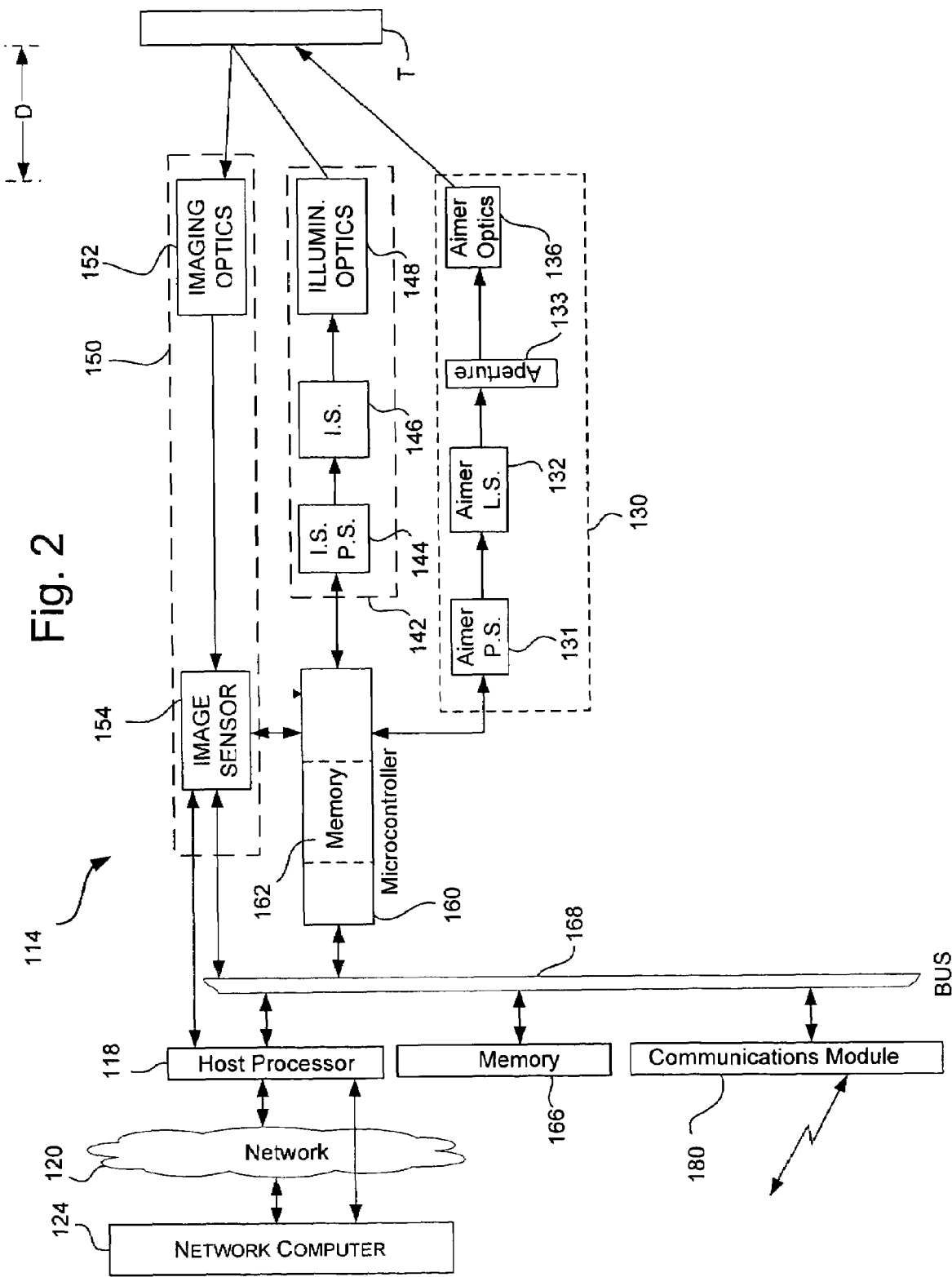
FIG. 2 is a block schematic diagram of an exemplary indicia reader in accordance with the present invention.

Referring to FIGS. 1 and 2, an optical indicia reader 112 may have a number of subsystems for capturing and reading images, some of which may have symbol indicia provided therein. Reader 112 may have an imaging reader assembly 114 provided within a head portion or housing 116 which may be configured to be hand held by a handle portion 113. A trigger 115 may be used to control operation of the reader 112. The head portion 116 may have a medial plane MP selected so that the hand-held imager is held with the head portion generally in a horizontal plane. The medial plane MP will generally be perpendicular to the face of the scanning head 116. Generally operators have a tendency to hold the medial plane of the head portion of the imager approximately normal to the plane of the target when collecting data. Image reader assembly 114 has imaging receive optics 152 having an optical axis (OA) for receiving light reflected from a target T and directing or projecting the reflected light from the target T to an image sensor 154. The optical axis is a line of symmetry through the imaging optics.

The receive optics 152 has a focal point wherein parallel rays of light coming from infinity converge at the focal point. If the focal point is coincident with the image sensor, the target (at infinity) is "in focus". A target T is said to be in focus if light from target points are converged about as well as desirable at the image sensor. Conversely, it is out of focus if light is not well converged. "Focusing" is the procedure of adjusting the distance between the receive optics and the image sensor to cause the target T to be approximately in focus.

The target may be any object or substrate and may bear a 1D or 2D bar code symbol or text or other machine readable indicia. A trigger 115 may be used for controlling full or partial operation of the reader 112.

Image sensor 154 may be a two-dimensional array of pixels adapted to operate in a global shutter or full frame operating mode which is a color or monochrome 2D CCD, CMOS, NMOS, PMOS, CID, CMD, etc. solid state image sensor. This sensor contains an array of light sensitive photodiodes (or pixels) that convert incident light energy into electric charge. Solid state image sensors allow regions of a full frame of image data to be addressed. An exemplary CMOS sensor is model number MT9V022 from Micron Technology Inc. or model number VC5602V036 36CLCC from STMicroelectronics.

Further description of image sensor operation is provided in commonly owned U.S. patent application Ser. No. 11/077, 995 entitled "BAR CODE READING DEVICE WITH GLOBAL ELECTRONIC SHUTTER CONTROL" filed on Mar. 11, 2005, which is hereby incorporated herein by reference in it's entirety.

In a full frame (or global) shutter operating mode, the entire imager is reset before integration to remove any residual signal in the photodiodes. The photodiodes (pixels) then accumulate charge for some period of time (exposure period), with the light collection starting and ending at about the same time for all pixels. At the end of the integration period (time during which light is collected), all charges are simultaneously transferred to light shielded areas of the sensor. The light shield prevents further accumulation of charge during the readout process. The signals are then shifted out of the light shielded areas of the sensor and read out.

Features and advantages associated with incorporating a color image sensor in an imaging device, and other control features which may be incorporated in a control circuit are discussed in greater detail in U.S. Pat. No. 6,832,725 entitled "An Optical Reader Having a Color Imager" incorporated herein by reference. It is to be noted that the image sensor 154 may read images with illumination from a source other than illumination source 146, such as by illumination from a source located remote from the reader.

The output of the image sensor may be processed utilizing one or more functions or algorithms to condition the signal appropriately for use in further processing downstream, including being digitized to provide a digitized image of target T.

Microcontroller 160, may perform a number of functions. The particulars of the functionality of microcontroller 160 may be determined by or based upon certain parameters which may be stored in memory or firmware. One such function may be controlling the amount of illumination provided by illumination source 146 by controlling the output power provided by illumination source power supply 144. Microcontroller 160 may also control other functions and devices.

An exemplary microcontroller 160 is a CY8C24223A made by Cypress Semiconductor Corporation, which is a mixed-signal array with on-chip controller devices designed to replace multiple traditional MCU-based system components with one single-chip programmable device. It may include configurable blocks of analog and digital logic, as well as programmable interconnects.

Microcontroller 160 may include a predetermined amount of memory 162 for storing firmware and data. The firmware may be a software program or set of instructions embedded in or programmed on the microcontroller which provides the necessary instructions for how the microcontroller operates and communicates with other hardware. The firmware may be stored in the flash ROM of the microcontroller as a binary image file and may be erased and rewritten. The firmware may be considered "semi-permanent" since it remains the same unless it is updated. This firmware update or load may be handled by a device driver.

The components in reader 112 may be connected by one or more bus 168 or data lines, such as an Inter-IC bus such as an I$^2$C bus, which is a control bus that provides a communications link between integrated circuits in a system. This bus may connect to a host computer in relatively close proximity, on or off the same printed circuit board as used by the imaging device. I$^2$C is a two-wire serial bus with a software-defined protocol and may be used to link such diverse components as the image sensor 154, temperature sensors, voltage level translators, EEPROMs, general-purpose I/O, A/D and D/A converters, CODECs, and microprocessors/microcontrollers.

The functional operation of the host processor 118 may involve the performance of a number of related steps, the particulars of which may be determined by or based upon certain parameters stored in memory 166 which may be any one of a number of memory types such as RAM, ROM, EEPROM, etc. In addition some memory functions may be stored in memory 162 provided as part of the microcontroller 160.

One of the functions of the host processor 118 may be to decode machine readable symbology provided within the target or captured image. One dimensional symbologies may include very large to ultra-small, Code 128, Interleaved 2 of 5, Codabar, Code 93, Code 11, Code 39, UPC, EAN, and MSI. Stacked 1D symbologies may include PDF, Code 16K and Code 49. 2D symbologies may include Aztec, Datamatrix, Maxicode, and QR-code. UPC/EAN bar codes are standardly used to mark retail products throughout North America, Europe and several other countries throughout the worlds. Decoding is a term used to describe the interpretation of a machine readable code contained in an image projected on the image sensor 154. The code has data or information encoded therein. Information respecting various reference decode algorithm is available from various published standards, such as by the International Standards Organization ("ISO").

Imaging reader assembly 114 may also have an aiming generator light source 132, aiming aperture 133, aiming optics 136, an illumination source(s) 146 and illumination optics 148.

Illumination and aiming light sources with different colors may be employed. For example, in one such embodiment the image reader may include white and red LEDs, red and green LEDs, white, red, and green LEDs, or some other combination chosen in response to, for example, the color of the symbols most commonly imaged by the image reader. Different colored LEDs may be each alternatively pulsed at a level in accordance with an overall power budget.

Aiming pattern generator 130 may include a power supply 131, light source 132, aperture 133 and optics 136 to create an aiming light pattern projected on or near the target which spans a portion of the receive optical system 150 operational field of view with the intent of assisting the operator to properly aim the scanner at the bar code pattern that is to be read. A number of representative generated aiming patterns are possible and not limited to any particular pattern or type of pattern, such as any combination of rectilinear, linear, circular, elliptical, etc. figures, whether continuous or discontinuous, i.e., defined by sets of discrete dots, dashes and the like.

Generally, the aiming light source may comprise any light source which is sufficiently small or concise and bright to provide a desired illumination pattern at the target. For example, light source 132 for aiming generator 130 may comprise one or more LEDs 134, such as part number NSPG300A made by Nichia Corporation.

The light beam from the LEDs 132 may be directed towards an aperture 133 located in close proximity to the LEDs. An image of this back illuminated aperture 133 may then be projected out towards the target location with a lens 136. Lens 136 may be a spherically symmetric lens, an aspheric lens, a cylindrical lens or an anamorphic lens with two different radii of curvature on their orthogonal lens axis. Alternately, the aimer pattern generator may be a laser pattern generator.

The light sources 132 may also be comprised of one or more laser diodes such as those available from Rohm. In this case a laser collimation lens (not shown in these drawings) will focus the laser light to a spot generally forward of the scanning hear and approximately at the plane of the target T. This beam may then be imaged through a diffractive interference pattern generating element, such as a holographic element fabricated with the desired pattern in mind. Examples of these types of elements are known, commercially available items and may be purchased, for example, from Digital Optics Corp. of Charlotte, N.C. among others. Elements of some of these types and methods for making them are also described in U.S. Pat. No. 4,895,790 (Swanson); U.S. Pat. No. 5,170,269 (Lin et al) and U.S. Pat. No. 5,202,775 (Feldman et al), which are hereby incorporated herein by reference.

Image reader may include an illumination assembly 142 for illuminating target area T. Illumination assembly 142 may also include one or more power supplies 144, illumination sources 146 and illumination optics 148.

A communications module 180 provides a communication link from imaging reader 114 to other imaging readers or to other systems such as host processor 118, memory 166, network 120, or network computer 124.

Figure 3:
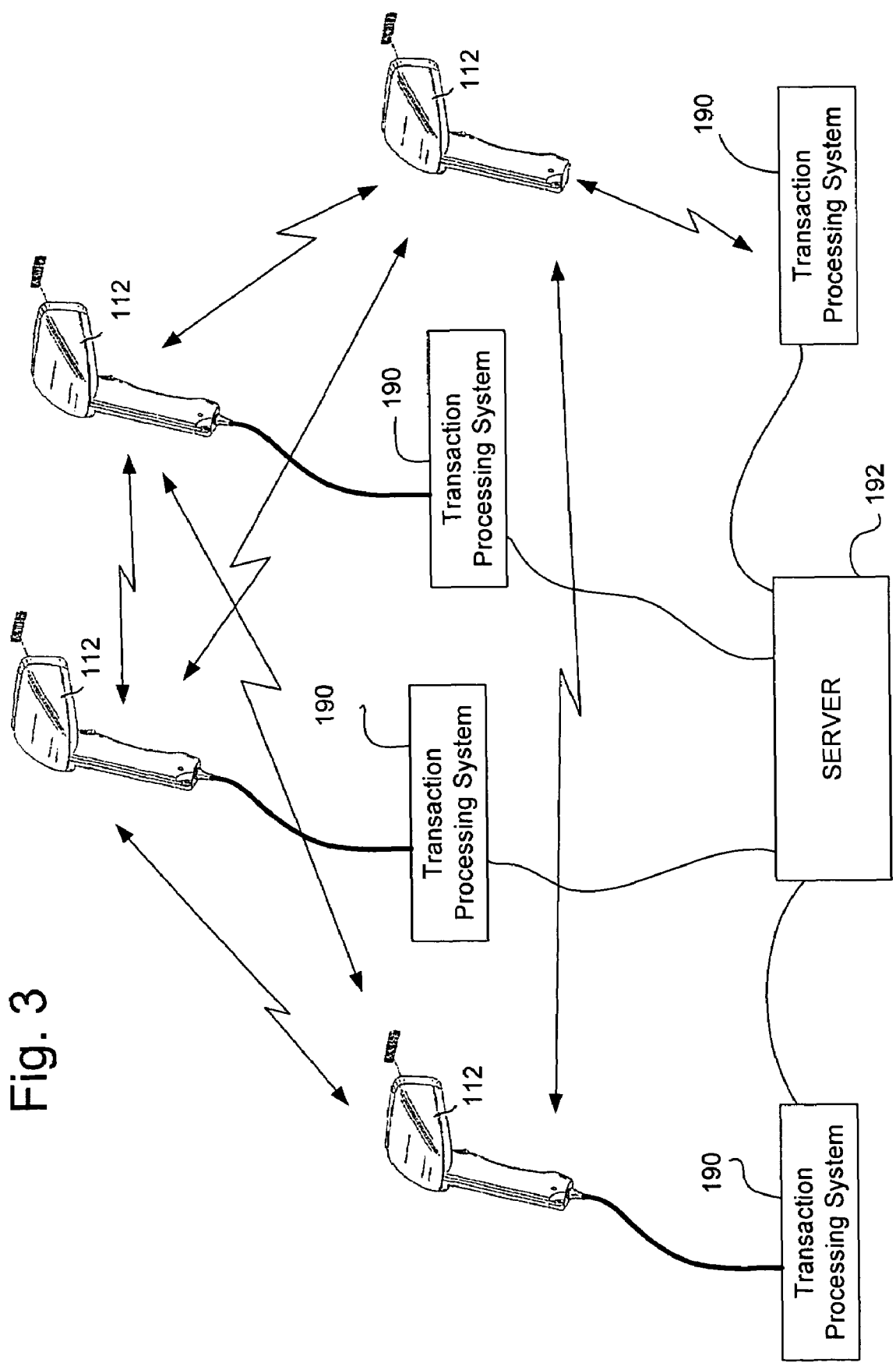
FIG. 3 is a block schematic diagram of an exemplary indicia reader system in accordance with the present invention.

FIG. 3 illustrates a scanning system configuration in accordance with the present invention, wherein a plurality of scanners 112 are being operated or utilized in a facility, such as a retail store. Each scanner may be in communication (wired or wireless) to a local transaction processing system 190, such as cash register. The transaction processing systems 190 may be in communication (wired or wireless) with a local server 192. End users, such as retail stores, typically have many scanners located in an area of proximity. Scanning performance, data integrity, user experience, customer experience and down time may contribute negative effects of not having the same firmware and/or configuration parameters common among all scanners being used in the same application.

Each scanner may be outfitted with a communication module, such as a radio or transceiver configured to communicate with other scanners that have an appropriate type communication module. For example, applicable scanners may be equipped with Bluetooth® (Bluetooth Special Interest Group (SIG)) wireless technology for the communication.

Scanners may be equipped with the ability to automatically query and communicate data, such as firmware amongst each other via a communication link, such as by radio link. Upgrading firmware from scanner to scanner (also referred to as crossloading) and duplicating configuration parameters may be performed without human intervention to ensure scanners are operating at the same revision and have the same configuration parameters reduces user frustration, down time, data integrity and increase efficiencies.

At predetermined time intervals each scanner may broadcast various information, such as its firmware revision, configuration parameters, etc. If a newer version of firmware or an updated configuration file is found on another scanner, the "old" scanner may request a copy from the "new" scanner. The old scanner may then download the newer files and update itself during a time of inactivity.

What is described is a data reader system comprising a plurality of indicia readers for reading symbol indicia and producing a symbol signal representative of the symbol indicia, at least two of the indicia readers comprising a processor for controlling the indicia reader, the processor having memory for storing firmware; a communication module configured to communicate with other indicia readers; and wherein the indicia reader system is configured to transfer firmware to other indicia readers utilizing the communication modules.

It should be understood that the programs, processes, methods and apparatus described herein are not related or limited to any particular type of computer or network apparatus (hardware or software). Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa. The illustrated embodiments are exemplary only, and should not be taken as limiting the scope of the present invention. For example, the steps of the flow diagrams may be taken in sequences other than those described, and more, fewer or other elements may be used in the block diagrams. Also, unless applicants have expressly disavowed any subject matter within this application, no particular embodiment or subject matter is considered to be disavowed herein.

The invention claimed is:

1. A data reader system comprising:
 a plurality of optical indicia readers for reading symbol indicia and producing a symbol signal representative of the symbol indicia, at least two of the indicia readers comprising:
 a processor for controlling the indicia reader, the processor having memory for storing firmware;
 a communication module configured to wirelessly communicate with other indicia readers; and,
 a housing for housing the processor and communication module configured with a handle portion for hand held operation,
 wherein the optical indicia reader system is configured to automatically update firmware and/or configuration parameters from optical indicia reader to all other optical indicia readers when one optical indicia reader is updated with new firmware and/or configuration parameters utilizing the communication modules.

2. The data reader system of claim 1 wherein each indicia reader further comprises:
 an illumination source and illumination and aiming optics for illuminating symbol indicia on a surface of a target; and
 imaging optics and an imaging sensor for capturing an image of the illuminated symbol indicia.

3. The data reader system of claim 1 further comprising:
 a plurality of transaction processing systems, each transaction processing system in communication with at least one of the indicia readers;
 a server in communication with each of the transaction processing systems.

4. The data reader system of claim 3, wherein at least one transaction processing system is a cash register.

5. The data reader system of claim 1 wherein each indicia reader illuminates symbol indicia on a surface of a target; and images the illuminated symbol indicia on an image sensor.

6. The data reader system of claim 5 wherein a transaction processing system communicates with a corresponding indicia reader and also communicates with a server.

7. A data reader system comprising:

a plurality of indicia readers for reading symbol indicia on a surface of a target and producing a symbol signal representative of the symbol indicia, said indicia readers having:

an illumination source and illumination and aiming optics for illuminating symbol indicia on the surface of the target;

imaging optics and an imaging sensor for capturing an image of the illuminated indicia, wherein at least two of the indicia readers comprising:

a processor for controlling the indicia reader, the processor having memory for storing firmware;

a communication module configured to communicate with other indicia readers;

a plurality of transaction processing systems, each transaction processing system in communication with at least one of the indicia readers for receiving the symbol signal produced by the reader;

a server in communication with each of the transaction processing systems;

wherein the data reader system is configured to automatically update firmware and/or configuration parameters from optical indicia reader to all other optical indicia readers when one optical indicia reader is updated with new firmware and/or configuration parameters utilizing the communication modules.

8. A method of operating a data reader system comprising the steps of:

providing a plurality of optical indicia readers having a handle for hand held operation for reading symbol indicia and producing a symbol signal representative of the symbol indicia:

controlling the optical indicia reader utilizing firmware; and, wirelessly updating firmware and/or configuration parameters between indicia readers utilizing communication modules, wherein the update occurs when a first optical indicia reader is provided updated firmware and the first optical indicia reader automatically updates all other indicia readers.

9. The method of operating a data reader system of claim 8, further comprising:

illuminating symbol indicia on a surface of a target with an illumination source and illumination and aiming optics; and capturing an image of the illuminated symbol indicia utilizing imaging optics and an imaging sensor.

10. The method of operating a data reader system of claim 8, further comprising:

a plurality of transaction processing systems, each transaction processing system communicating with at least one of the indicia readers; and a server communicating with each of the transaction processing systems.

11. The method of operating a data reader system of claim 10, wherein at least one transaction processing system is a cash register.

* * * * *